United States Patent [19]
Chi

[11] 4,456,645
[45] Jun. 26, 1984

[54] METHOD OF MAKING AN INTEGRAL CARBONIZED COOLER ASSEMBLY

[75] Inventor: Chang V. Chi, Brookfield, Conn.

[73] Assignee: Energy Research Corporation, Danbury, Conn.

[21] Appl. No.: 313,807

[22] Filed: Oct. 22, 1981

[51] Int. Cl.³ .......................... B32B 3/00; B32B 31/26
[52] U.S. Cl. ...................................... 428/166; 62/404;
 156/155; 156/291; 156/292; 165/58; 264/29.1;
 428/167; 428/172; 428/188; 428/408; 429/26
[58] Field of Search .................... 156/155, 291, 292;
 428/166, 167, 188, 408, 172; 55/267; 62/404;
 165/58; 264/29.1; 429/26

[56] References Cited
U.S. PATENT DOCUMENTS
4,192,906  3/1980  Maru ...................................... 429/13

OTHER PUBLICATIONS

The enumerated pages of the following reports covering a Period from Oct. 1, 1977 to Jun. 30, 1979, made under U.S. Government Contracts EY-76-C-03-1169 and DE-AC-03-79 ET 11301: Report 1, pp. 8-10; Report 2, pp. 19-33; Report 3, pp. 11-18; Report 4, pp. 9-16; Report 5, pp. 8-12; Report 6, pp. 16-36; and Report 7, pp. 3-4, United Technologies, 1977-1979.

*Primary Examiner*—Robert A. Dawson

[57] ABSTRACT

A practice for gas cooler assembly fabrication wherein a first plate comprised of carbonizable material is provided in first regions with a conductive first material and in second bordering regions with an adhesive material and the first plate and a second plate comprised of carbonizable material are brought into adjacent relationship and carbonized by heating to thereby form the completed assembly.

8 Claims, 2 Drawing Figures

METHOD OF MAKING AN INTEGRAL CARBONIZED COOLER ASSEMBLY

BACKGROUND OF THE INVENTION

This invention pertains to fuel cell stacks and, in particular, to gas cooler assemblies used in such stacks.

In the construction of fuel cell stacks, it is typical to provide a system for cooling the fuel cells of the stack. U.S. Pat. No. 4,192,906, assigned to the same assignee hereof, teaches a fuel cell stack comprising a gas cooling system which includes plate structure supported within the stack and having passages for carrying a cooling gas. This plate structure is situated in the stack so as to be electrically in series with its adjacent fuel cells. As a result, it must exhibit good electrical conductivity, at least in its interior regions, these regions serving to couple electrical energy between the adjacent cells. The plate structure also, of course, must exhibit good thermal conductivity so as to provide the necessary cell cooling.

As above-noted, the above plate structure is supported within the fuel cell stack to form the cooling system. The plate structure, therefore, is not in the form of an integral cooler assembly which itself can be handled as a commercial unit and removed or installed in the stack as desired. As a result, considerable research has been carried out to devise practices for forming the plate structure as an integral commercial unit.

In one practice, graphite-resin material, owing to its high electrical and thermal conductivities, its acid resistance and its moldability, is used to form each cooler assembly. Difficulties have been encountered, however, in attempting to form the assembly from a single plate. Thus two plates are typically used, these plates being joined together by bonding. Such practice further contemplates realizing an improved integral gas cooler assembly by carbonizing the plate resin material through heating the plates prior to bonding.

It is an object of the present invention to provide an integral gas cooler assembly having improved characteristics.

It is a further object of the present invention to provide an integral gas cooler assembly having improved electrical conductivity and strength.

SUMMARY OF THE INVENTION

In accordance with the principles of the present invention, the above and other objectives are realized in a practice wherein a conductive first material is applied to first regions of a first plate comprised of carbonizable material and an adhesive second material is applied to the plate second regions bordering the first regions. The first plate and a second plate also comprised of a carbonizable material are then brought into adjacent relationship so that corresponding first and second regions are brought together, the first regions of the plates, in turn, defining cooling channels. The assembly is then heated to carbonize the plates.

By heat treating the plates subsequent to assembly, the resultant structure does not suffer from misalignment problems which are encountered when the plates are first carbonized and then assembled. An integral cooler assembly thus results which has good conductivity and sufficient strength for commercial handling.

In the form of the invention to be disclosed hereinafter, the first material is also carbonizable and it likewise is carbonized during carbonizing of the plates. If the adhesive is also carbonizable and the heating temperatures of the assembly are sufficient to carbonize the adhesive, a gas seal can be placed around the interface between the first and second plates so as to ensure that the assembly is gas-tight.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 2:
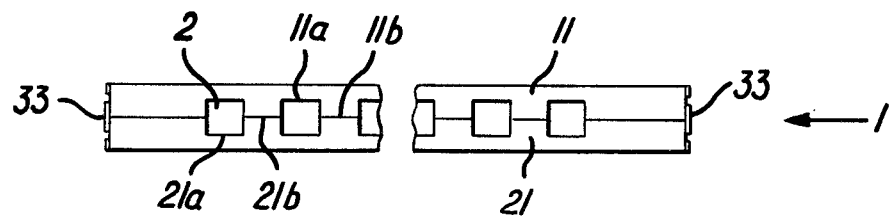
FIG. 2 illustrates the plate of FIG. 1 joined to a corresponding plate to form a cooler assembly.

FIG. 2 illustrates an integral gas cooler assembly 1 in accordance with the practice of the present invention. The assembly 1 comprises an upper plate 11 and a lower plate 21 which together define cooling passages 2 for carrying a cooling fluid through the assembly. In the present illustrative case, plate 11 includes grooves 11a which define therebetween lands 11b, these grooves and lands cooperating with corresponding grooves and lands 21a and 21b in the plate 21.

Figure 1:
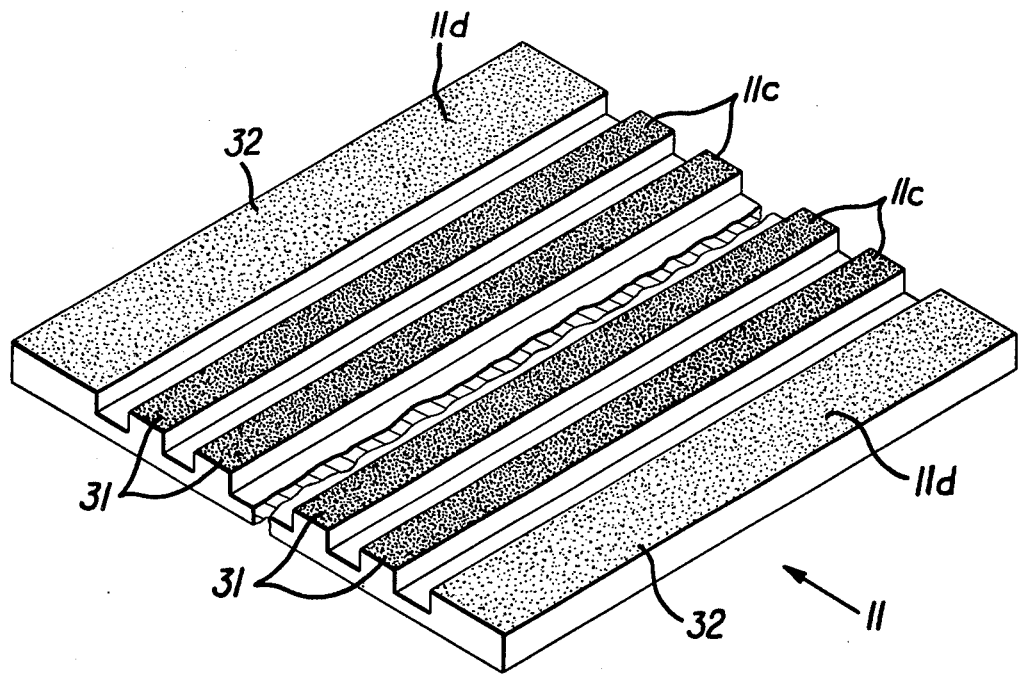
FIG. 1 shows a plate whose regions have been treated in accordance with the invention.

FIG. 1 shows the plate 11 prior to formation of the assembly 1. In accordance with the invention, a conductive first material 31 and an adhesive second material 32 are applied, respectively, to first or interior regions 11c and to second or peripheral regions 11d of the plate 11. The adhesive material 32 provides a strong bond between the plate 11 and the plate 21 upon the plates being joined, thereby forming the assembly 1 as an integral unit capable of being handled without resultant separation of the plates 11 and 21. The conductive material 31, on the other hand, enhances the electrical contact or conductivity at the inner contacting regions of the two plates, whereby the assembly 1 is able to provide good electrical conductivity for its adjacent fuel cells.

In further accord with the invention, the plates 11 and 21 each comprise a carbonizable material and are in a carbonized state when the assembly 1 is in its completed form. More particularly, the first and second materials 31 and 32 are first applied to the plate 11 in uncarbonized state and the uncarbonized plate is then brought into contact with the plate 21 which is also uncarbonized at this time. The assembly of the two plates is then heat treated under pressure at a temperature above the plate carbonizing temperature. This carbonizes the plates and causes curing of the second material, so as to result in bonding of the plates. Preferably, the first material is also carbonizable and is, simultaneously, carbonized during heat treatment of the assembly. Such carbonizing of the plates and first material further enhances plates conductivity in the interior assembly regions where electricity is generated.

By carbonizing the plates after the plates are brought together, alignment of the corresponding grooves and lands is readily accomplished. This contrasts with assemblies in which carbonization is carried out prior to assembly. In such case, the plates, typically, experience different degrees of shrinkage, making subsequent alignment during assembly extremely difficult, if not impossible.

If the adhesive material is also a carbonizable material, the heat applied could be sufficiently high to carbonize the adhesive. In such case, it is preferable to apply a gas seal 33 at the interface of the two plates 11 and 21 to prevent any possibility of gas leakage through the carbonized adhesive.

The material of the plates 11 and 21, preferably, comprises a graphite-resin mixture. Likewise, the first material 31, preferably, also comprises a graphite-resin mixture compatible with that of the plates. More preferably, the latter mixture is substantially the same as that of the plates. Useable resins are colloid resins, phenolic resins, furfural alcohol resins, epoxy resins and combinations of these resins. The second material 32 is defined in accord with the invention as a material whose adhesive strength after carbonization of the plates is sufficient to hold the plates together under usual commercial handling conditions. A typical second material might be Chem-grip HT (Chem-grip HT is a tradename used in conjunction with the sale of an adhesive material comprising epoxy resin cured with dianhydride. Usable gas seals might be Viton glue.

It should be noted that the invention can be practiced by also applying adhesive material and conductive material to the plate 21, as in areas of the plate 21 corresponding to the areas 11c and 11d respectively, of the plate 11.

EXAMPLE I

A cooler assembly was fabricated in accordance with the invention utilizing plates 11 and 21 each comprised of 33 percent Colloid 8440, 49 percent Graphite A99 and 18 percent Graphite 850. A thin film of Chem-grip HT was then applied to the regions 11d of plate 11 and to corresponding peripheral regions of the plate 21. This film was approximately one eighth of an inch in width. A mixture having the same composition as that of the plates was then further mixed with isopropanol until a good consistency was obtained. This mixture was then applied by roller to the inner regions 11c of plate 11 and to the corresponding inner regions of plate 21.

The two plates were then brought together so as to appropriately align the grooves and lands 11a and 11b with the respective grooves and lands 21a and 21b. The composite was then subjected to compression at 345 kPa in a holding fixture and subjected to heating at 200° C. for 2 hours to thereby cure the Chem grip-HT cement. Thereafter, the assembly was carbonized by heating at 950° C. After the heating procedure, Viton glue was applied to the interface between the plates as an additional gas seal.

In all cases, it is understood that the above-described practices are merely illustrative of the many possible specific embodiments which represent applications of the present invention. Numerous and varied other practices can readily be devised in accordance with the principles of the invention without departing from the spirit and scope of the invention.

What I claim is:

1. A method of making an integral gas cooler assembly for use in cooling a fuel cell comprising:
   applying an electrically conductive material to first regions of a first plate comprised of carbonizable material;
   applying an adhesive material which is different from said conductive material to second regions of said first plate, said second regions bordering said first regions;
   subsequent to said application of adhesive and conductive materials bringing said first plate and a second plate comprised of carbonizable material into adjacent relationship such that said first and second regions of said first plate are brought together with corresponding first and second regions of said second plate, said first regions of said first and second plates defining cooling channels;
   heating said plates when an adjacent relationship at a temperature sufficient to carbonize said plates;
   and said adhesive, subsequent to carbonization of said plates, having sufficient adhesive strength to hold said plates together under commercial handling conditions.

2. A method in accordance with claim 1 wherein:
   said conductive material comprises a carbonizable material.

3. A method in accordance with claim 2 wherein:
   said heating is at a temperature sufficient to carbonize said conductive material.

4. A method in accordance with claim 2 wherein:
   said first and second plates and said conductive material comprise substantially the same carbonizable material.

5. A method in accordance with claim 1 wherein:
   said adhesive comprises a carbonizable material;
   and said heating is at a temperature sufficient to carbonize said adhesive material.

6. A method in accordance with claim 5 further comprising:
   applying a gas seal along the interface between said first and second plates.

7. A method in accordance with claim 1 wherein:
   said adhesive material comprises epoxy resin cured with dianhydride.

8. An integral gas cooler assembly made by the method of claims 1, 2, 3, 4, 5, 6 or 7.

* * * * *